(12) United States Patent
Sprague et al.

(10) Patent No.: US 11,079,630 B1
(45) Date of Patent: Aug. 3, 2021

(54) WIDE LATERAL ANGLE FRONTLIGHT FOR USE WITH REFLECTIVE DISPLAYS

(71) Applicant: Amazon Technologies, Inc., Seattle, WA (US)

(72) Inventors: Robert Arthur Sprague, Saratoga, CA (US); Jerry Yee-Ming Chung, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/713,695

(22) Filed: Dec. 13, 2019

(51) Int. Cl.
*G02F 1/13357* (2006.01)
*F21V 8/00* (2006.01)
*G02F 1/1335* (2006.01)

(52) U.S. Cl.
CPC ..... *G02F 1/133615* (2013.01); *G02B 6/0031* (2013.01); *G02F 1/133524* (2013.01); *G02F 1/133553* (2013.01); *G02F 1/133616* (2021.01)

(58) Field of Classification Search
CPC .. G02B 6/0028; G02B 6/0038; G02B 6/0045; G02B 6/0031; G02F 1/133615; G02F 1/133616; G02F 1/133524; G02F 1/133553

USPC ..................................................... 349/61–71
See application file for complete search history.

(56) References Cited

U.S. PATENT DOCUMENTS

| | | | |
|---|---|---|---|
| 2007/0279727 A1* | 12/2007 | Gandhi | G02B 6/0055 359/242 |
| 2014/0049983 A1* | 2/2014 | Nichol | G02B 6/0028 362/610 |

* cited by examiner

*Primary Examiner* — Charles S Chang
(74) *Attorney, Agent, or Firm* — Eversheds Sutherland (US) LLP

(57) ABSTRACT

Devices, systems, and methods are provided for generating a wide angle frontlight for use with reflective displays. A display device may include a first end and a second end opposite the first end, and a first side and a second side opposite the first side. The display device may include a first light source, and a first light guide able to receive first light from the first light source. The display device may include a reflective display, the first light guide including a first refractive device, the first refractive device refracts a first portion of the first light toward the reflective display in a first direction toward the first side and to refract a second portion of the first light toward the reflective display in a second direction toward the second side, and the first direction separated from the second direction by a first angle of at least forty degrees.

20 Claims, 9 Drawing Sheets

US 11,079,630 B1

WIDE LATERAL ANGLE FRONTLIGHT FOR USE WITH REFLECTIVE DISPLAYS

BACKGROUND

A variety of devices, such as electronic book ("e-Book") reader devices, desktop computers, portable computers, smartphones, tablet computers, game consoles, televisions, and so forth are used to access various forms of content. These devices may be subjected to varying lighting conditions, and when these devices have narrow viewing angle displays, these devices may present content with a limited field of view such that a device user may not see the content when viewing the content from an angle.

DETAILED DESCRIPTION

Overview

Figure 1:
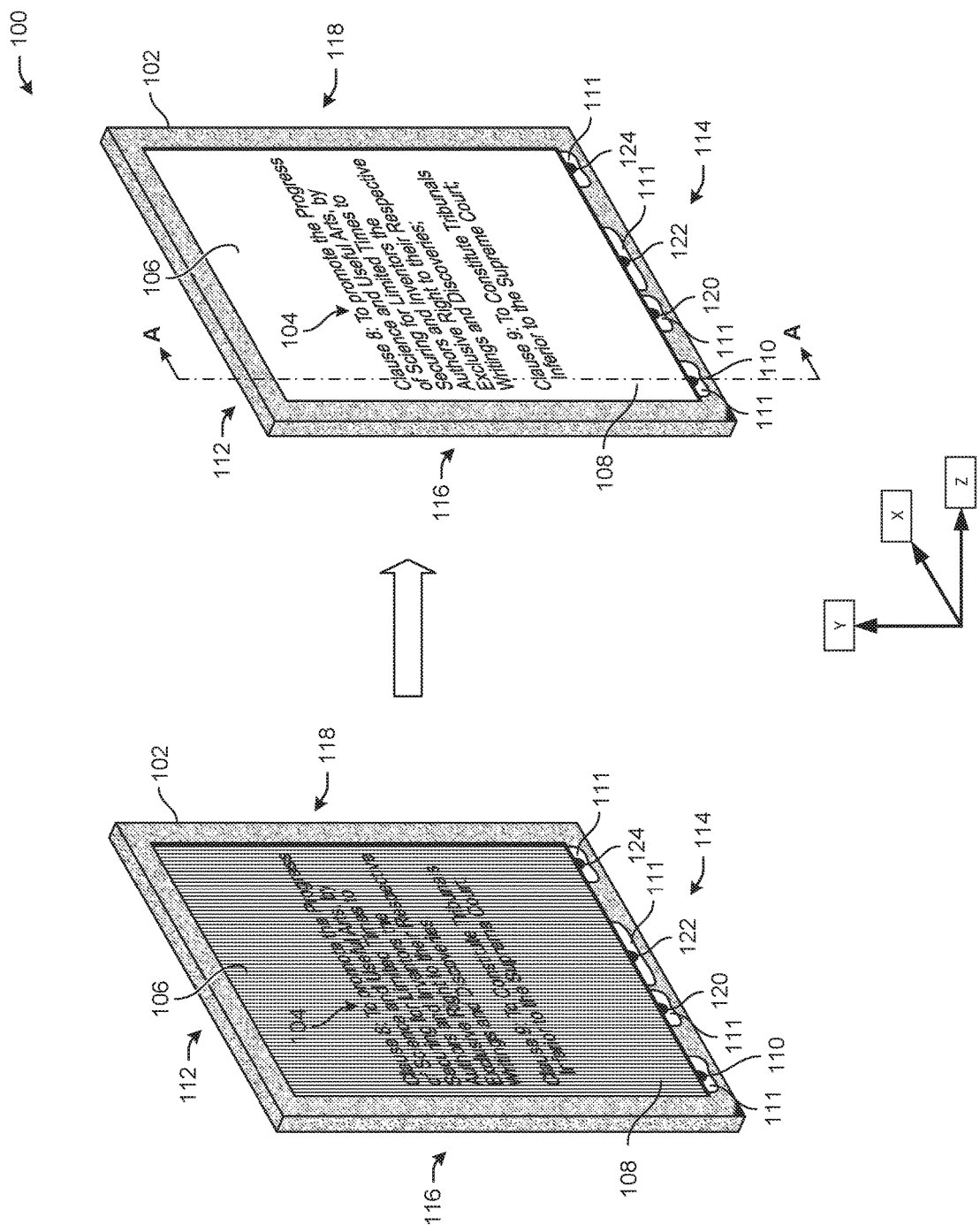
FIG. 1 illustrates a system for presenting content using a device, in accordance with one or more example embodiments of the present disclosure.

Example embodiments described herein provide certain systems, methods, and devices for generating wide viewing angles with reflective displays.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

Electronic devices may be used to consume digital content. Some electronic devices may be configured to display or present digital content on a display device, such as a frontlit display device. A variety of devices, such as electronic book or e-reader devices, desktop computers, portable computers, smartphones, tablet computers, televisions, wearable devices, and so forth may be used to access various forms of content and other information. Display devices may be used to present content in one or more colors. In some instances, light emitting diodes (LEDs) of various colors may be used to render and/or present digital content on a display device. For example, an LED array with one or more LEDs may be used to emit light that propagates through a display stack causing an image or other content to be presented at the display device. Display stacks may include components such as, in one example, light guides, touch layers, capacitive sensors, cover layers or protective layers, and/or other components including a pixelated LCD display panel which modulates light to produce the image. The display stacks may be used as part of an electronic device to present content in one or more colors.

Liquid crystal displays ("LCD") use liquid crystals to generate images. Liquid crystal displays may be configured to operate in reflective, transmissive, or transflective modes. In a reflective LCD, a reflector is disposed behind the LCD and configured to reflect ambient light back through the LCD generally towards the user.

Some devices that display content may have narrow viewing angle displays. For example, electronic book ("e-Book") reader devices with reflective display (e.g., a reflective LCD as described above) may have a narrower view angle display than a laptop screen or television. A display with narrow view angle shows content appearing too dark to a viewer when the viewer attempts to view the displayed content from an angle (e.g., from the side of a device rather than directly in front of the device). For example, at angles of thirty degrees from normal (e.g., thirty degrees from directly in front of the display), some devices may appear to a viewer to lose a significant amount of pixel brightness (e.g., a 50% reduction in brightness when the viewing angle increases from 30 degrees to 40 degrees from normal).

E-book reader devices may be held vertically (e.g., in a portrait orientation) or horizontally (e.g., in a landscape orientation). Some e-book reader devices may provide large viewing angles in both the portrait and landscape orientations. Some e-book reader devices with a reflective display, however, may provide a better viewing angle in the horizontal axis than in the vertical axis, so the portrait orientation may best present the text of a printed hardcover or softcover book. Therefore, when a person reads content presented by some e-book reader devices with a reflective display using the portrait orientation, the person may be unable to read the content from a viewing angle of thirty degrees or more from an axis normal to the display of the device.

When using color displays to display content, limited viewing angles may render displayed text or other content difficult or impossible for a viewer to discern when a person views the content from anywhere that is not almost directly in front of the display. In particular, e-book reader devices may use reflective displays, such as reflective LCDs, to display e-book content in color. Reflective displays on e-book reader devices may have a smaller light scattering profile than some other types displays may have.

Reflective displays may be used in combination with light guides, which may include films, layers, or other equipment used to direct light from one side of a device to another (e.g., from top-to-bottom or bottom-to-top). Light emitted from a light source, such as a LED of a device, may propagate from end-to-end of the device using one or more light guides. Emitted light may propagate from a light guide toward a reflective surface of the reflective display, and the reflective surface may reflect the emitted light away from the device and toward a viewer to create displayed content for consumption. When the angle of incidence from emitted light as it impinges the reflective surface of a reflective display (e.g., a display with a reflective layer, such as a mirror, behind a liquid crystal layer, where light passes through the liquid crystal layer and is reflected by the reflective layer toward a viewer), the corresponding angle of reflection for the emitted light is equal to the angle of incidence due to the law of reflection. Some e-book reader devices may not have a viewing angle of thirty degrees or more from normal with respect to the reflective display because light may not be scattered at such angles by the reflective surface and there may not be a corresponding source at the equal reflective angle from that position.

Because of a device's viewing angle being limited (e.g., less than 180 degrees), when viewing a device from a significant angle to a side of the device, a viewer may experience a decrease in intensity of light reflected by the device (e.g., the content displayed by the device may appear darker from the side than from a viewing angle at or normal to the display). In particular, devices with reflective displays may generate a smaller viewing angle than some other types of devices.

Therefore, some devices, such as e-book reader devices with reflective displays, may benefit from presenting content at improved viewing angles.

In one or more embodiments, a device such as an e-book reader device, a wearable device, and a signage device, among other devices, may display content, such as text and/or images of a book, by reflecting light emitted by one or more light sources using a reflective display. For example, some devices may have light guides positioned proximate a front end of a device (e.g., the end from which a viewer sees content presented by the device), and reflective displays behind the light guides (e.g., toward a back end of the device). The device may use one or more light guides to propagate light from one end of the device to another, with extraction features positioned in the light guides for extracting (e.g., refracting) light from the light guides. The extracted light may impinge on a reflective surface of the reflective display (e.g., a reflector disposed behind a LCD) positioned behind the one or more light guides, and the reflective display may reflect the extracted light. A viewer may see the light reflected by the reflective display. The varying angles of incidence and refraction used in the reflection of the extracted light may provide an improved viewing angle for the device.

In one or more embodiments, the use of light guides and extraction features (e.g., also referred to as extraction structures, refraction devices, refractive devices, refractive features) may improve the viewing angle of the device. The extraction devices may be of varying sizes and densities, and may be positioned at varying orientations and positions within the light guides so as to refract portions of light at different locations in the light guide and emitted at different angles by the light source. The refractions of light may propagate in a direction toward the reflective display positioned behind the one or more light guides, and the refracted light may impinge upon the reflective display at varying angles of incidence with respect to the reflective display. The angles of incidence with respect to the reflective display may depend on the angles at which the light is refracted from the one or more light guides. Therefore, by extracting light at different angles from the one or more light guides, the device may reflect light at varying angles, allowing for an increased viewing angle of the device. For example, the different angles of incidence with respect to the reflective display may result in varying and increased angles of reflection (e.g., more than thirty degrees relative to the axis normal to the reflective display). The increased angles of light reflected by the reflective display may result in an improved viewing angle produced by the device.

Some devices may use reflective LCDs to modulate the intensity of each display pixel. Input light emitted by a light source may strike the reflective surface of the LCD at an angle of incidence, going through the liquid crystal, and may return through the display to an observer. LCDs present their highest quality image when viewed directly in front of the display because the most light that is reflected toward the viewer may be reflected toward the viewer at or near an axis normal to the device (e.g., straight ahead from the device). In one or more embodiments, by using light emitted by one or more LEDs and having multiple angles of incidence with respect to the reflective LCD because of the number and position of refraction devices in one or more light guides, the angular field of view of the device may be broadened. In particular, as more light is reflected toward the sides of a device at larger angles of reflection (e.g., thirty degrees or more from an axis normal to the device), more light can be seen by a viewer from side viewing angles with respect to the device, and therefore a viewer may discern more content displayed by the device when viewing from side angles.

In one or more embodiments, by using a wider light source or a number of light sources spread horizontally, the angular spread of devices with reflective displays may be improved. Using light guides with refraction devices at varying positions and densities, a device may cause light to be reflected off of the reflective LCD at varying angles so that the device's viewing angle is improved.

Some light guides may use extraction features to extract light toward a reflective surface of a reflective display. For example, a light guide may be in front of and more proximate to a viewer than the reflective surface of the reflective display, which may be behind the light guide. An extraction feature may be a curved device that refracts emitted light toward the reflective surface of the reflective display to produce the illumination used to present content on the device.

In one or more embodiments, to provide improved viewing angles for devices with reflective displays, extraction structures (e.g., semicircular shaped devices, oval shaped devices, or other shaped devices) may be extended in size and shape, and may have varying sizes and densities, to produce a wider range of refracted light angles emitted by a light source. In particular, larger extraction structures positioned at varying locations and orientations may refract light at different angles and emitted by multiple light sources toward the reflective layer of a reflective display, resulting in varied angles of incidence and reflection with the reflective display. The light reflected and different angles may provide a mostly uniform intensity over a broader range of angles than some devices provide. The extraction structures may be tilted with respect to a vertical axis (e.g., 20 degrees in either direction), and the light sources may be translated sideways with respect to the extraction features. To minimize the footprint, light sources may be positioned on one end of the light guides, and side edges may be positioned to reflect angular light rays back into the field of interest without requiring a wider light guide. In some embodiments, light guides may be stacked (e.g., overlapping) one over another, and tilted with respect to one another, to generate reflections at a variety of angles.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates a system 100 for presenting content using a device 102, in accordance with one or more example embodiments of the present disclosure. For clarity of illustration, the figures in this disclosure are not depicted to scale. For ease of description, three axes orthogonal to one another are shown, designated as X, Y, and Z. For ease of discussion, and not by way of limitation, in this disclosure, "front" indicates a side which may be proximate to a user during typical use of the device 102, while "back" indicates a side opposite the front which is distal to the user during typical use, along the Z axis depicted here.

Referring to FIG. 1, the system 100 may include the device 102 (e.g., a display device), which may display content 104 (e.g., text, images, video, etc.) on a display panel 106 (e.g., an LCD panel) using a light guide 108 and one or more light sources (e.g., LEDs such as light source 110, light source 120, light source 122, light source 124), which may be positioned in one or more light chambers 111. The device 102 may include a first end 112 (e.g., a top end), a second end 114 (e.g., a bottom end), a first side 116 (e.g., a left side), and a second side 118 (e.g., a right side). Alternatively, the second end 114 may be the top end, and the first end 112 may be the bottom end.

As shown on the left side of FIG. 1, the device 102 may display the content 104 when viewed from an angle (e.g., with respect to the X-axis). The content 104 may appear dark and difficult to read at an angle as shown. However, on the right side of FIG. 1, the content 104 presented by the device 102 at the same angle may be discernable for reasons explained further below.

Figure 2A:
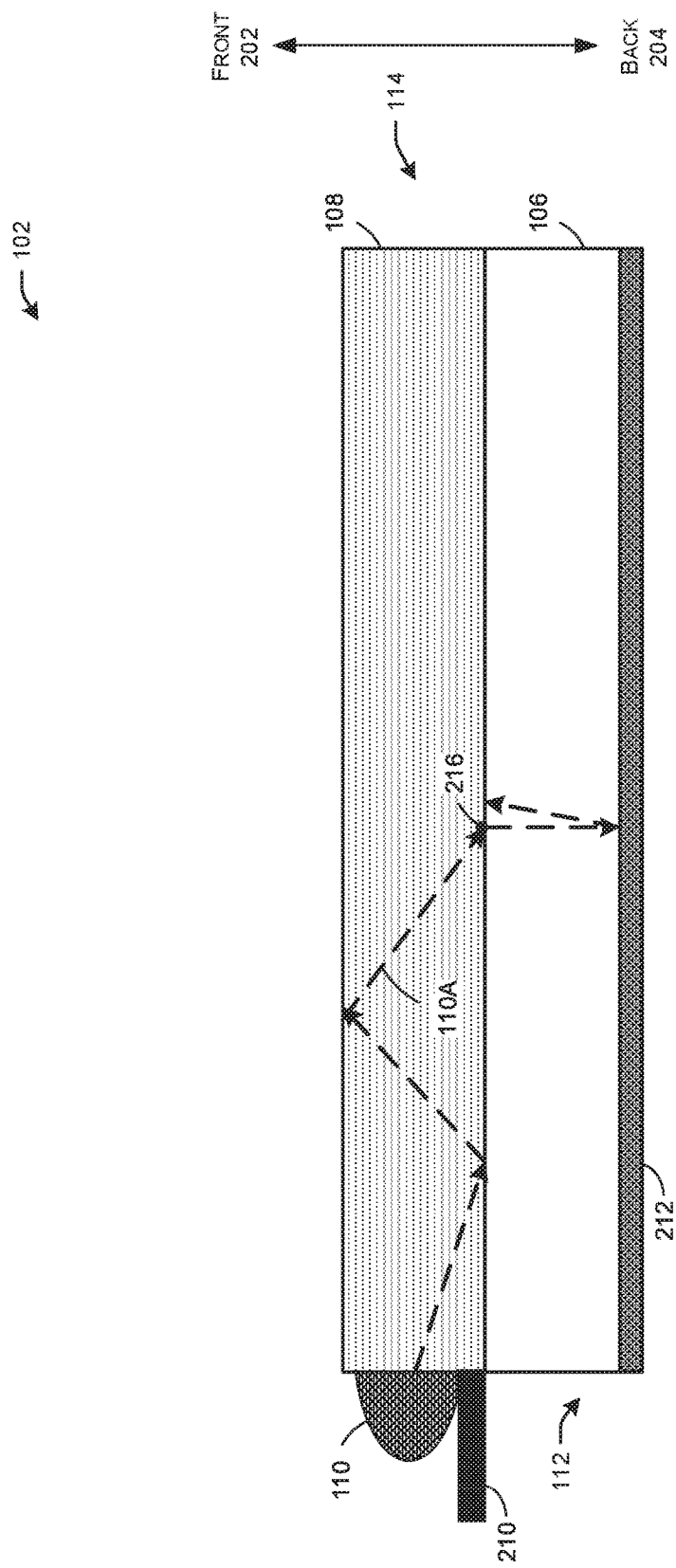
FIG. 2A illustrates a cross-sectional view along line "A" of one implementation of the device of FIG. 1, in accordance with one or more example embodiments of the present disclosure.
Figure 2A:
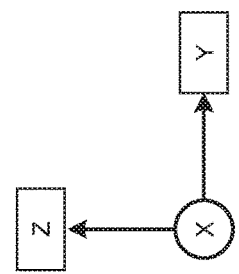
Figure 2B:
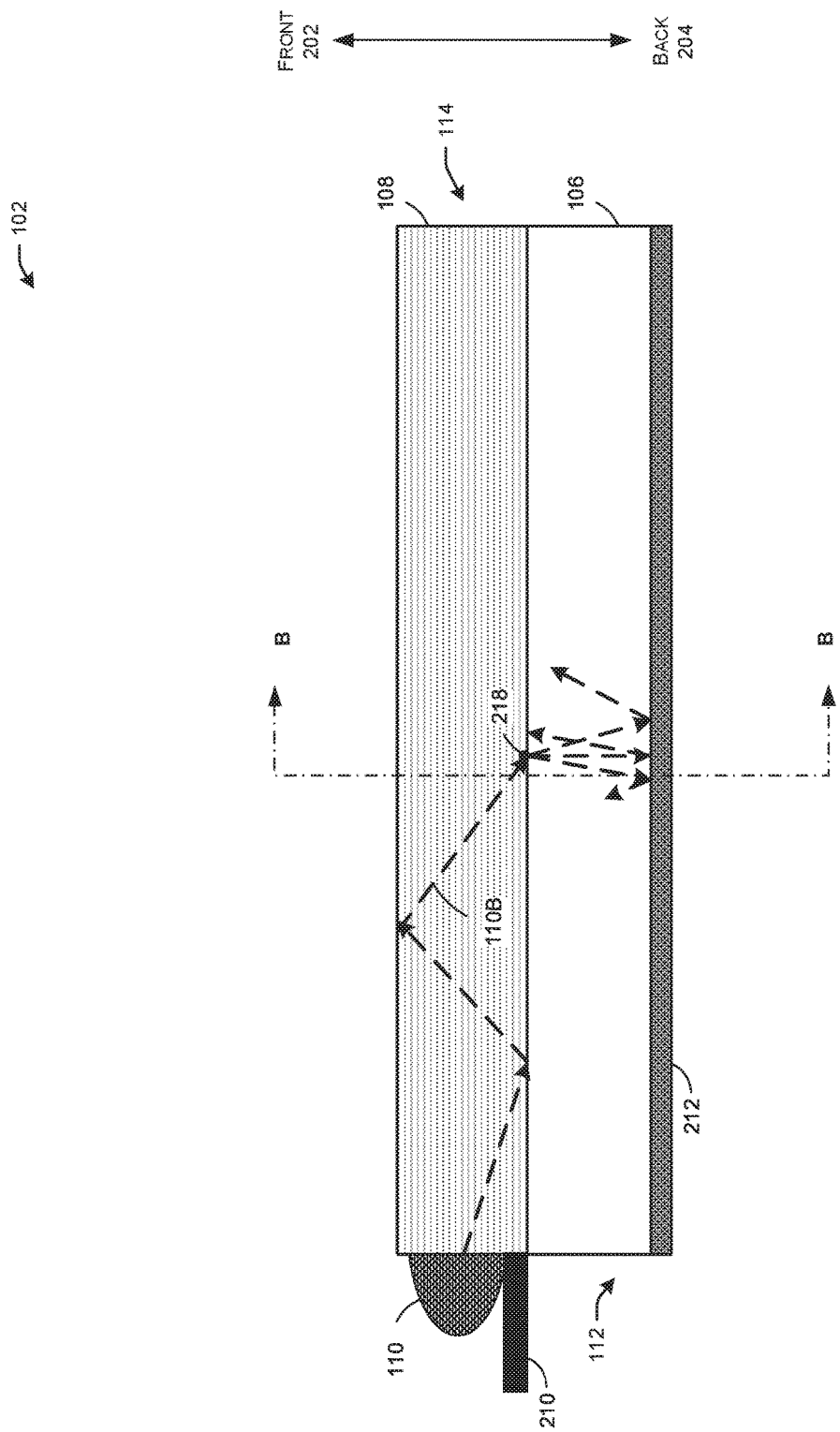
FIG. 2B illustrates a cross-sectional view along line "A" of one implementation of the device of FIG. 1, in accordance with one or more example embodiments of the present disclosure.
Figure 2C:
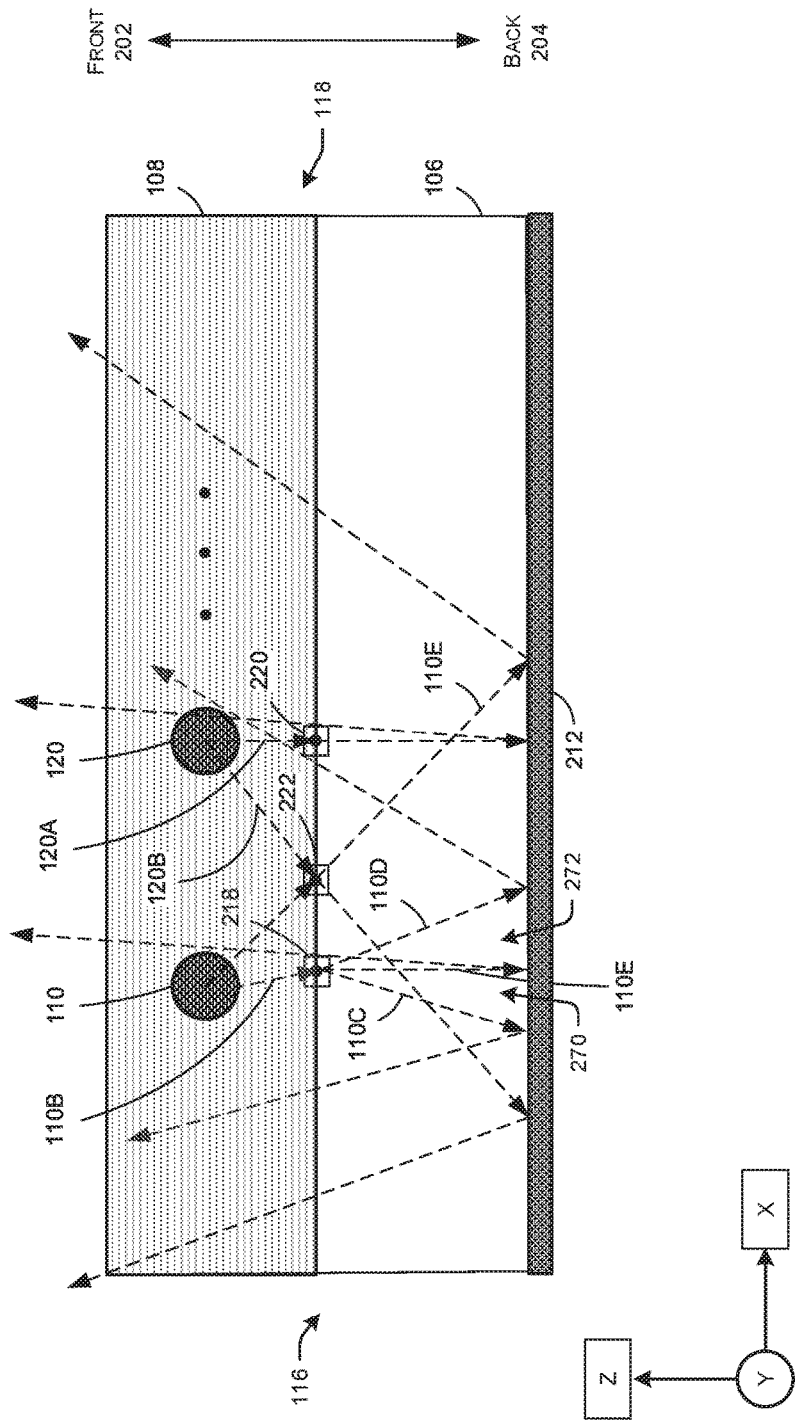
FIG. 2C illustrates a cross-sectional view along line "B" of one implementation of the device of FIG. 2B, in accordance with one or more example embodiments of the present disclosure.

The display panel 106 may be a reflective LCD panel and may include one or more of electrodes, liquid crystal material, polarizers, or color filters. A reflector (e.g., as shown in FIG. 2A, FIG. 2B, and FIG. 2C) may be optically coupled to the display panel 106, or integrated therein. The reflector may reflect incident light. The incident light may include ambient light, emitted light from the one or more light sources of the device 102, or both. In some implementations the reflector may include a mirror, film, paint, coating, and so forth. For example, aluminum may be deposited on a back side of a second polarizer in the display panel 106 to form the reflector. Other materials may also be used to form the reflector including, but not limited to, silver or gold. The thickness of the deposited layer may be at least 800 nanometers or another thickness. In some implementations, the mirror may include one or more dielectric materials to form a dielectric mirror.

The reflector may be directive in that incident light is directed along particular paths. Some of the components in the display panel 106 may be optically disruptive. That is, these components may block or distort light in ways which are undesirable from a standpoint of overall reflectivity of the display panel 106. For example, the electrodes within a LCD that control the liquid crystal material may result in areas of decreased transmittance. The directive reflector may direct incident light to avoid at least a portion of a plurality of the display components which may be optically disruptive.

Arranged in front of the display panel 106 is a light guide 108. The light guide 108 may be laminated to the display panel 106. The light guide 108 may be substantially planar and may comprise one or more materials such as plastic, glass, aerogel, metal, ceramic, and so forth. The light guide 108 may be configured with one or more features on the surface thereof, integral with, or embedded within, which are configured to direct light along pre-determined paths. These features may be refractive, diffractive, reflective, and so forth. In one implementation, the features may comprise a plurality of surface relief structures. These structures may be on the order of about 10 microns or less in one lateral dimension.

The light guide 108 may distribute at least a portion of light emitted by the light source 110 to the display panel 106. The one or more light sources are shown here in a cutaway view of the device 102. The one or more light sources may emit light when activated. The light emitted may comprise photons in infrared wavelengths, visible wavelengths, ultraviolet wavelengths, or a combination thereof. The one or more light sources may include one or more LEDs, cold cathode fluorescent lamp ("CCFL"), electroluminescent materials, sonoluminescent materials, fluorescent lights, incandescent lights, or a combination thereof. In some implementations, different types of the one or more light sources may be used in the same device 102. For example, electroluminescent lights may be used in conjunction with LEDs. The one or more light sources may be arranged along one or more sides or ends (e.g., along the X-axis proximate the first end 112 or proximate the second end 114). The one or more light sources may be adjacent to and may be optically coupled to the light guide 108 such that light emitted from the one or more light sources may be distributed to at least a portion of the display panel 106 using the light guide 108.

The optical coupling between the light guide 108 and the one or more light sources 110 may include one or more of physical proximity, an air gap, an adhesive, a mechanical interface, and so forth. In some implementations, one or more surface features may be provided on the light guide 108, the one or more light sources, or both. These surface features (e.g., refraction devices as explained further below), such as diffusers, grooves, grating, dimples, lenses, planar surfaces, concave surfaces, convex surfaces, and so forth, may be used to enhance or attenuate the transmission or dispersion of light between the one or more light sources and the light guide 108. In some implementations, these surface features may be separate or discrete elements which have been coupled to the light guide 108. For example, a microlens array may be adhered to the light guide 108 to aid the optical coupling with the light source 110.

In one or more embodiments, the device 102 be driven by a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

FIG. 2A illustrates a cross-sectional view along line "A" of one implementation of the device 102 of FIG. 1, in accordance with one or more example embodiments of the present disclosure.

Referring to FIG. 2A, the device 102 may be positioned such that a front 202 of the device 102 is above a back 204 of the device along the Z-axis. In this orientation, the content 104 may be seen from the front 202 (e.g., further up on the page above the light guide 108). The light guide 108 may be in front of the display panel 106, which may be in front of a reflective display 212 (e.g., a reflective LCD, a reflective portion, a reflective layer, or a reflective device). A light source 110 may emit light 110A from the first end 112 of the device 102 toward the second end 114 of the device (e.g., in a direction along with the Y-axis). Portions of the light emitted by the light source 110 may be emitted at any angle with respect to the Y-axis, and the light guide 108 may direct any emitted light from the first end 112 to the second end 114. For example, the light 110A may be emitted at an angle toward the Z-axis, and may propagate from the first end 112 to the second end 114 using the light guide 108.

Still referring to FIG. 2A, the light guide 108 may include extraction features (e.g., refraction features as described above), including an extraction structure 216. The extraction feature 216 may extract the light 110A from the light guide 108 by refracting the light 110A in a direction that is toward the display panel 106 and its reflector 212 (e.g., refracted in a direction along the Z-axis downward on the page). The angle at which the light 110A is refracted toward the display panel 106 and its reflector 212 may be parallel to the display panel 106 and its reflector 212 (e.g., normal to the Z-axis downward on the page) or close to normal (e.g., within ten degrees of normal). Because of the normal or almost normal angle of refraction of the light 110A, the light 110A may have an angle of incidence of 90 or almost 90 degrees with the reflective display 212, and therefore an angle of reflection of 90 or almost 90 degrees, resulting in the light 110A being reflected upward along the Z-axis toward the front 202 where the content 104 of FIG. 1 may be seen best at a viewing angle that is normal or close to normal (e.g., parallel to the Z-axis), and may be seen poorly at increasing viewing angles from normal (e.g., viewed further along the Y-axis in either direction on the page).

FIG. 2B illustrates a cross-sectional view along line "A" of one implementation of the device 102 of FIG. 1, in accordance with one or more example embodiments of the present disclosure.

Referring to FIG. 2B, the device 102 may be positioned such that a front 202 of the device 102 is above a back 204 of the device along the Z-axis. In this orientation, the content 104 may be seen from the front 202 (e.g., further up on the page above the light guide 108). The light guide 108 may be in front of the display panel 106, which may be in front of a reflector 212 (e.g., a reflective LCD, a reflective portion, a reflective layer, or a reflective device). A light source 110 may emit light 110A from the first end 112 of the device 102 toward the second end 114 of the device (e.g., in a direction along with the Y-axis). Portions of the light emitted by the light source 110 may be emitted at any angle with respect to the Y-axis, and the light guide 108 may direct any emitted light from the first end 112 to the second end 114. For example, the light 110A may be emitted at an angle toward the Z-axis, and may propagate from the first end 112 to the second end 114 using the light guide 108.

Still referring to FIG. 2B, the light guide 108 may include a different extraction structure (e.g., extraction structure 218) than the extraction structure 216 of FIG. 2A. The extraction structure 218 may be larger and/or may have a different density than the extraction structure 216, and may be positioned at a different angle with respect to the Y-axis. The result of the extraction structure 218 having a different size, density, and/or angle than the extraction structure 216 may be that light 110B emitted by the light source 110 may be refracted differently than the light 110A of FIG. 2A. In particular, the light 110B may be refracted in different portions at different angles as shown (e.g., a first portion of the light 110B may be refracted downward along the Z-axis and coming out of the page along the X-axis toward the first side 116 of FIG. 1, a second portion of the light 110B may be refracted downward along the Z-axis at or near normal to the display panel 106 and its reflector 212, and a third portion of the light 110B may be refracted downward along the Z-axis and going into the page along the X-axis toward the second side 118 of FIG. 1). The result of the different portions of the light 110B refracted at different angles in different directions, not all of which may be normal or close to normal (e.g., parallel to the Z-axis) as explained further in FIG. 2C.

FIG. 2C illustrates a cross-sectional view along line "B" of one implementation of the device 102 of FIG. 2B, in accordance with one or more example embodiments of the present disclosure.

The cross-sectional view along line "B" is shown in FIG. 2C with the Y-axis going into and coming out of the page, whereas FIG. 2B shows the device 102 with the Y-axis from left to right on the page. In this manner, FIG. 2C is shown from the second end 114 of FIG. 1, and FIG. 2B is shown from the first side 116 of FIG. 1.

Referring to FIG. 2C, the light 110B emitted by the light source 110 may arrive at the refractive device from behind the extraction structure 218 on the page (e.g., from along the Y-axis coming out of the page). The 218 extraction structure may refract a first portion 110C of the light 110B at a first angle 270 with respect to the Z-axis (e.g., normal to the display panel 106 and its reflective display 212). The extraction structure 218 may refract a second portion 110D of the light 110B at a second angle 272 with respect to the Z-axis.

The extraction structure 218 may refract a third portion 110E of the light 110B at an angle normal to the display panel 106 and its reflective display 212. Such dispersion caused by the refraction may result in different angles of incidence with respect to the reflective display 212, and therefore different angles of reflection. For example, the third portion 110E may reflect normal toward the front 202 of the device 102 (e.g., parallel to the Z-axis upward on the page). The first portion 110C may reflect in a direction that is toward the first side 116 of the device 102 (e.g., upward along the Z-axis and leftward on the X-axis). The second portion 110D may reflect in a direction that is toward the second side 118 of the device 102 (e.g., upward along the Z-axis and rightward on the X-axis).

Still referring to FIG. 2C, the light source 120 is shown and may emit a first portion of light 120A at a first angle and a second portion of light 120B at a second angle. A refractive device 220 may be positioned proximate to the light source 120, and a extraction structure 222 may be positioned in between the light source 110 and the light source 120. The extraction structure 220 may refract the first portion of light 120A toward the back 204. The extraction structure 222 may refract a fourth portion of light 110E emitted by the light source 110 toward the back 204, and may refract the second portion of light 120B emitted by the light source 120 toward the back 204.

As a viewer views the device 102 from the left (e.g., from the left of the first side 116), for example, the amount (e.g., intensity, brightness) of light seen by the viewer may increase because more light may be reflected by the reflective display 212 in a direction that is toward the first side 116. By increasing the amount of light that can be seen at angles other than normal to the reflective LCD, a person may be able to read and discern content from an angle (e.g., when the device is tilted or when the device is positioned at a side of the person rather than directly in front of the person).

In one or more embodiments, the angle 270 may be 20 degrees or more toward the first side 116 (e.g., along the X-axis as a transverse axis spanning from the first side 116 to the second side 118), and the angle 272 may be 20 degrees or more toward the second side 118 (e.g., along the X-axis as a transverse axis spanning from the first side 116 to the second side 118). The angle 270 may be larger than 20 degrees, and the angle 272 may be larger than 20 degrees. The angle 270 and the angle 272 may be separated by at least 30 degrees (e.g., the angle 270 may be at least 20 degrees toward the first side 116 and the angle 272 may be at least 10 degrees toward the second side 118). In this manner, more light may be reflected toward the first side 116 and toward the second side 118, thereby increasing the viewing angle of light seen from respective sides of the device 102. For example, rather than the brightness of light reflected the reflective display 212 and seen from wide angles of greater than 30 degrees decreasing (e.g., the brightness falling from 60 Nits to below 40 Nits at angles of 40 degrees or greater from normal), the device 102 may maintain uniformity of the brightness of the light (e.g., may produce an improved viewing angle), allowing for the brightness at 30 degrees or greater from normal to remain above 60 Nits.

Figure 3A:
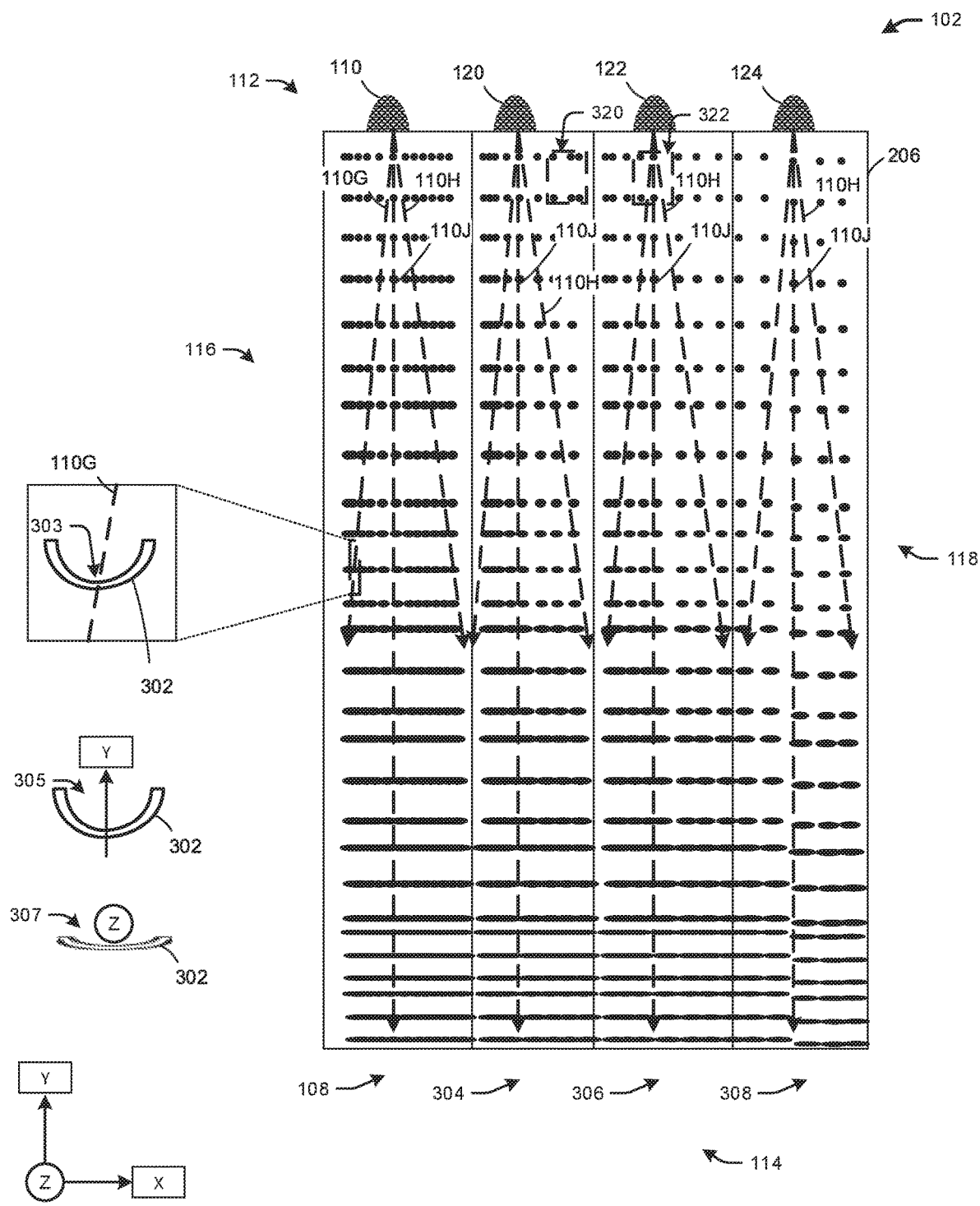
FIG. 3A illustrates light guides of one implementation of the device of FIG. 1, in accordance with one or more example embodiments of the present disclosure.

FIG. 3A illustrates light guides of one implementation of the device 102 of FIG. 1, in accordance with one or more example embodiments of the present disclosure.

Referring to FIG. 3A, the device 102 may include the light guide 108 of FIG. 1 and corresponding to the light source 110 of FIG. 1, and the device may include additional light sources proximate to the first end 112, arranged horizontally along the X-axis, and having respective light guides (e.g., light source 120 may emit light into light guide 304, extending from a position proximate the first end 112 along the Y-axis to a position proximate the second end 114; light source 122 may emit light into light guide 306, extending from a position proximate the first end 112 along the Y-axis to a position proximate the second end 114; light source 124 may emit light into light guide 308, extending from a position proximate the first end 112 along the Y-axis to a position proximate the second end 114). The light guides may be planar and/or parallel to one another, and may include the same or different numbers of extraction structures (e.g., the dots, corresponding to the refractive device 218 of FIG. 2B and FIG. 2C).

Still referring to FIG. 3A, the light source 110 may emit portions of light (e.g., portion 110G, portion 110H, portion 110J) in different directions and angles. A extraction structure 302 may be a curved structure that may refract the portion 110G into the page (e.g., along the Z-axis and toward the reflective display 212 as shown in FIG. 2B and FIG. 2B with the light 110B). The refraction point 303 may be a location on the extraction structure 302 at which the portion 110G is refracted into the page (e.g., as shown in FIG. 2C where the light 110B is refracted into multiple portions). The extraction structure 302 may be positioned at an angle 305 with respect to the Y-axis and at an angle 307 with respect to the Z-axis to cause the refraction of the portion 110G at any refraction angle. The other extraction structures may be the same or different sizes as the extraction structure 302, and may be positioned at different angles with respect to the Y-axis and the Z-axis.

Figure 3B:
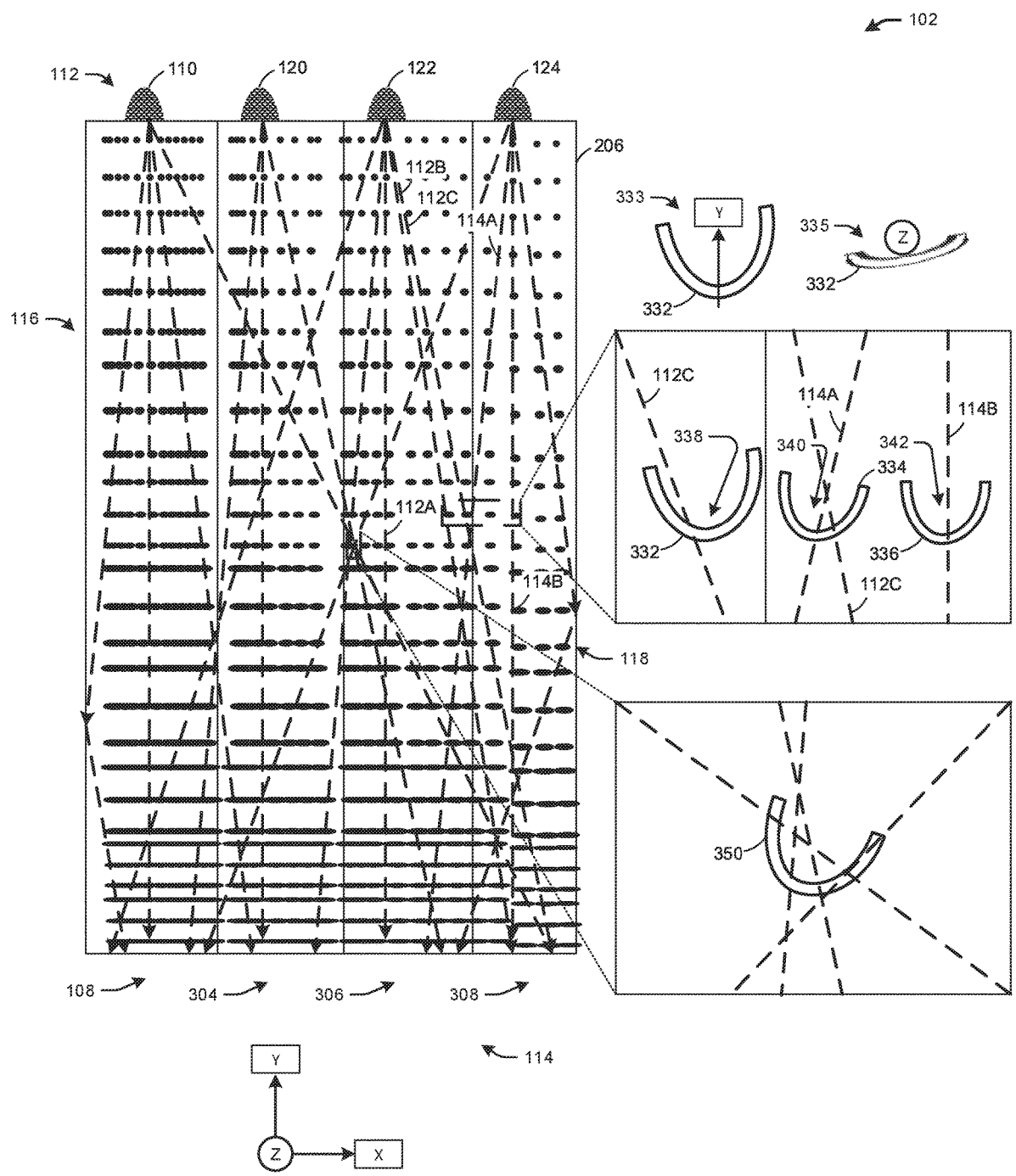
FIG. 3B illustrates light guides of one implementation of the device of FIG. 1, in accordance with one or more example embodiments of the present disclosure.

FIG. 3B illustrates light guides of one implementation of the device 102 of FIG. 1, in accordance with one or more example embodiments of the present disclosure.

Referring to FIG. 3B, the device 102 may include the light guide 108 of FIG. 1 and corresponding to the light source 110 of FIG. 1, and the device may include additional light sources proximate to the first end 112, arranged horizontally along the X-axis, and having respective light guides (e.g., the light source 120 may emit light into the light guide 304, extending from a position proximate the first end 112 along the Y-axis to a position proximate the second end 114; the light source 122 may emit light into the light guide 306, extending from a position proximate the first end 112 along the Y-axis to a position proximate the second end 114; the light source 124 may emit light into the light guide 308, extending from a position proximate the first end 112 along the Y-axis to a position proximate the second end 114). The light guides may be planar and/or parallel to one another, and may include the same or different numbers of refractive devices (e.g., the dots, corresponding to the refractive device 218 of FIG. 2B and FIG. 2C).

Still referring to FIG. 3B, the light source 122 may emit portions of light (e.g., portion 112A, portion 112B) and the light source 124 may emit portions of light (e.g., portion 114A, portion 114B) in different directions and angles. Reflective device 332, refractive device 334, and refractive device 336 may be curved structures with the same or different sizes, densities, and orientations/tilts (e.g., angles respective to the Y-axis and/or Z-axis, such as angle 333 with respect to the Y-axis and angle 335 with respect to the Y-axis). The refractive device 332 may refract the portion 112B into the page (e.g., along the Z-axis and toward the reflective display 212 as shown in FIG. 2B and FIG. 2B with the light 110B). The refractive device 334 may refract the portion 114A into the page (e.g., along the Z-axis and toward the reflective display 212 as shown in FIG. 2B and FIG. 2B with the light 110B). The refractive device 336 may refract the portion 114B into the page (e.g., along the Z-axis and toward the reflective display 212 as shown in FIG. 2B and FIG. 2B with the light 110B). The portions may be refracted at different angles and/or in different directions (e.g., toward the first side 116, toward the second side 118, normal/coming out of the page along the Z-axis, etc.). The refraction point 338 may be a location on the extraction structure 338 at which the portion 112B is refracted into the page (e.g., as shown in FIG. 2C where the light 110B is refracted into multiple portions). The refraction point 340 may be a location on the extraction structure 334 at which the portion 114A is refracted into the page (e.g., as shown in FIG. 2C where the light 110B is refracted into multiple portions). The refraction point 342 may be a location on the extraction structure 336 at which the portion 114B is refracted into the page (e.g., as shown in FIG. 2C where the light 110B is refracted into multiple portions). The extraction structure 332 may be positioned at an angle with respect to the Y-axis and at an angle with respect to the Z-axis to cause the refraction of the portion 110G at any refraction angle. The other extraction structures may be the same or different sizes as the extraction structure 332, and may be positioned at different angles with respect to the Y-axis and the Z-axis. The inside edges of the light guide 108, the light guide 304, and/or the light guide 308 may be polished, allowing light emitted by the light sources to be reflected back into the field.

Still referring to FIG. 3B, because extraction structures nearer to the center of the device 102 may receive more light from the different light sources than refractive devices nearer the sides of the device 102, the refractive devices nearer to the center of the device may receive light at different angles. For example, the refractive device 350 may receive light emitted by any of the light source 110, the light source 120, the light source 122, and the light source 124 at different angles of incidence, and may refract the emitted light toward the reflective display 212 of FIG. 2C (e.g., in the Z-direction into the page).

In one or more embodiments, the sizes (e.g., lengths, arcs, thicknesses, etc.) of the extraction structures may be the same for some extraction structures and different for other extraction structures. For example, the sizes or densities may increase or decrease going from the center of the device 102 toward a respective side (e.g., the size or density of the extraction structure 332 may be greater than the size or density of the extraction structure 334, which may be greater than the size or density of the extraction structure 336, or the order of size or density may be reversed). The density of extraction structures may increase as a distance between the extraction structures and the light sources increase. For example, as shown in FIG. 3A, the density 320 of extraction structures between the light source 120 and the light source 122 may be more than the density 322 of extraction structures nearer to the light source 122. The densities of extraction structures may be different than or substantially similar to the densities of any other extraction structures. For example, the density of extraction structures nearer to a light source on the device 102 be less than the density of extraction structures further away from the light source on the device 102. The number of extraction structures in a respective light guide may be the same as or different than the number of extraction structures in any other light guide. For example, light guides nearer to the center of the device 102 may have more extraction structures than light guides at toward the sides of the device, or the reverse may be true.

Figure 4:
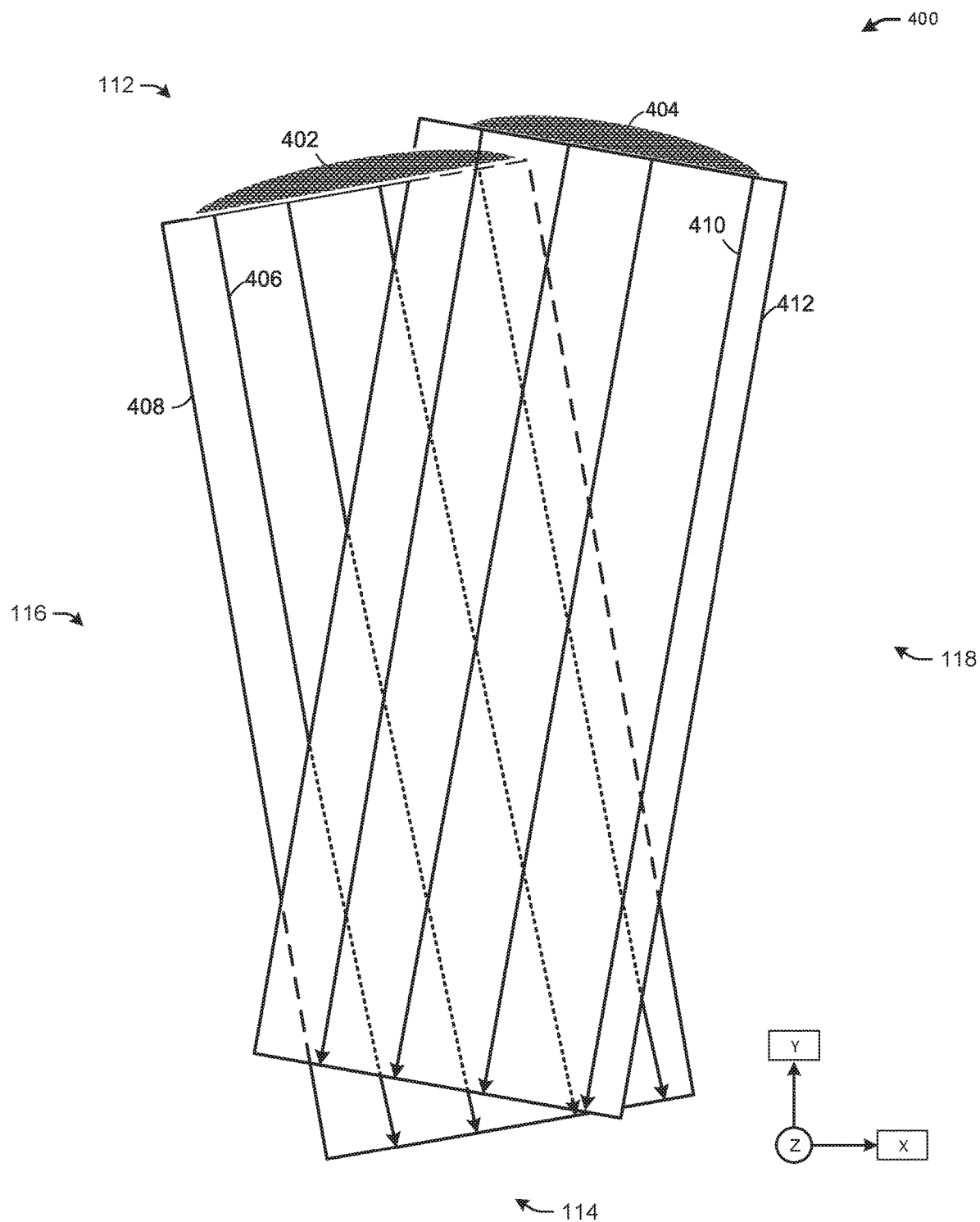
FIG. 4 illustrates overlapping light guides, in accordance with one or more example embodiments of the present disclosure.

FIG. 4 illustrates overlapping light guides, in accordance with one or more example embodiments of the present disclosure.

Referring to FIG. 4, instead of the light guides in parallel as shown in FIG. 3A and FIG. 3B, the device 102 of FIG. 1 may include overlapping or stacked light guides as shown. For example, the device 102 may include light source 402 and light source 404. The light source 402 may emit light 406 into light guide 408, and the light source 404 may emit light 410 into light guide 412. The light guide 412 may be in front of the light guide 408 (e.g., the light guide 412 may be closer to the front of the page than the light guide 408). The light guide 408 and the light guide 412 may be tilted with respect to one another. While the extraction structures are not shown in FIG. 4, they may be positioned at different angles and/or tilts with respect to one or more axes as shown in FIG. 3A and in FIG. 3B.

Figure 5:
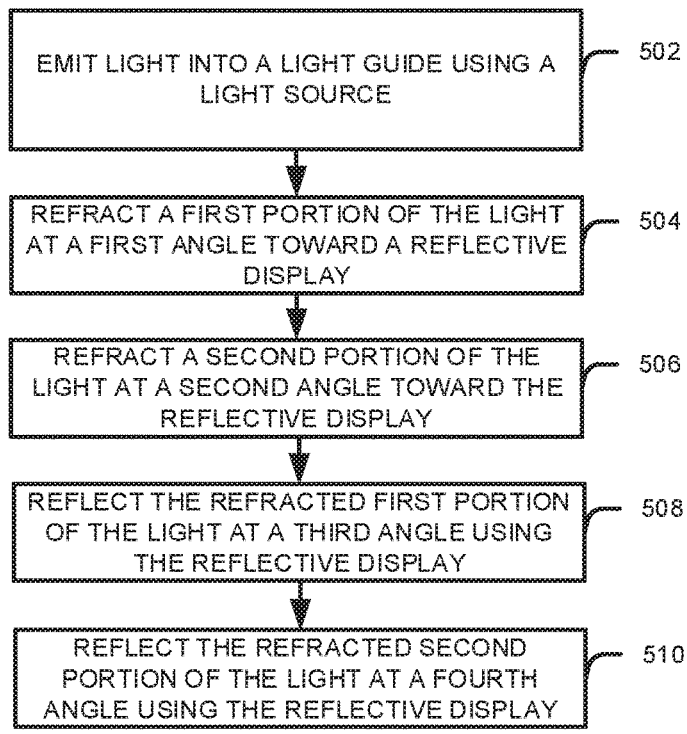
FIG. 5 illustrates a flow diagram for a process for using a wide lateral angle frontlight display with one implementation of the device of FIG. 1, in accordance with one or more example embodiments of the present disclosure.

FIG. 5 illustrates a flow diagram for a process 500 for using a wide lateral angle frontlight display with one implementation of the device 102 of FIG. 1, in accordance with one or more example embodiments of the present disclosure.

At block 502, a display device (e.g., the device 102 of FIG. 1) may emit light (e.g., light 110A of FIG. 2A, light 110B of FIG. 2B and FIG. 2C, the portion 110G of FIG. 3A, the portion 110H of FIG. 3A, the portion 110J of FIG. 3A, the portion 112A of FIG. 3B, the portion 112B of FIG. 3B, the portion 114A of FIG. 3B, the portion 114B of FIG. 3B) into a light guide (e.g., the light guide 108 of FIG. 1, FIG. 2A, FIG. 2B, FIG. 2C, FIG. 3A, and FIG. 3B; light guide 304 of FIG. 3A and FIG. 3B; light guide 306 of FIG. 3A and FIG. 3B; light guide 308 of FIG. 3A and FIG. 3B, light guide 408 of FIG. 4; light guide 412 of FIG. 4) using a light source (e.g., the light source 110 of FIG. 1, FIG. 2A, FIG. 2B, FIG. 2C, FIG. 3A, and FIG. 3B; light source 120 of FIG. 3A and FIG. 3B; light source 122 of FIG. 3A and FIG. 3B; light source 124 of FIG. 3A and FIG. 3B; light source 402 of FIG. 4; light source 404 of FIG. 4). The light source may be one of multiple light sources positioned along an axis at one side or end of the device. Any light source of the device may emit light into a respective light guide, which may span from one side or end of the device to another side or end of the device, directing the emitted light from one end to another or from one side to another.

At block 504, the display device may refract a first portion of the light (e.g., the first portion 110C of FIG. 2C, the portion 112B of FIG. 3B, the portion 114A of FIG. 3B, the portion 114B of FIG. 3B) at a first angle (e.g., the angle 270 of FIG. 2C) toward a reflective display (e.g., the reflective display 212 of FIG. 2A, FIG. 2B, FIG. 2C). The angle may be measured with respect to an axis normal (e.g., perpendicular) to the reflective display and in a direction toward a side of the display device (e.g., the first side 116, the second side 118). An extraction structure (e.g., the extraction structure 218 of FIG. 2B and FIG. 2C) may refract the first portion of the light, and may be positioned at an angle respective to one or more axes to cause refraction at angles that may be up to or greater than 40 degrees from the axis normal to the reflective display. The light guide or any other light guide may include any number of extraction structures with the same or different sizes, densities, locations, distances from light sources or sides/ends, and at the same or different positions (e.g., angles and/or tilts).

At block 506, the display device may refract a second portion of the light (e.g., the second portion 110D of FIG. 2C, the portion 112B of FIG. 3B, the portion 114A of FIG. 3B, the portion 114B of FIG. 3B) at a second angle (e.g., the angle 272 of FIG. 2C) toward a reflective display (e.g., the reflective display 212 of FIG. 2A, FIG. 2B, FIG. 2C). The angle may be measured with respect to an axis normal (e.g., perpendicular) to the reflective display and in a direction toward a side of the display device (e.g., the first side 116, the second side 118). An extraction structure (e.g., the extraction structure 218 of FIG. 2B and FIG. 2C) may refract the second portion of the light, and may be positioned at an angle respective to one or more axes to cause refraction at angles that may be up to or greater than 40 degrees from the axis normal to the reflective display. The light guide or any other light guide may include any number of extraction structures with the same or different sizes, densities, locations, distances from light sources or sides/ends, and at the same or different positions (e.g., angles and/or tilts). The direction at which the first portion of light is refracted may be the same as or different than the direction at which the second portion of light is refracted. The angle separating the direction of the first portion and the second portion of light may be up to or greater than 40 degrees (e.g., one angle of refraction may be closer to normal than the other angle of refraction, adding up to 40 degrees or some other angle between the first and second directions of refraction).

At block 508, the display device may reflect the refracted first portion of the light at a third angle using the reflective display. For example, the angle of incidence of the first portion of the light with respect to the reflective display may be the angle of refraction (e.g., the angle 270 of FIG. 2C) of the first portion of the light, and the angle of reflection (e.g., the third angle) may equal the angle of incidence. Therefore, when the angle of refraction of the first portion of the light is 30 degrees or greater in a direction toward a side of the display device, the first portion of the light may be reflected at 30 degrees or greater toward the side of the display device. The result may be an improved viewing angle, allowing a viewer to read content presented by the device based on the reflections of light (e.g., improving the device's viewing angle).

At block 510, the display device may reflect the refracted second portion of the light at a fourth angle using the reflective display. For example, the angle of incidence of the second portion of the light with respect to the reflective display may be the angle of refraction (e.g., the angle 270 of FIG. 2C) of the first portion of the light, and the angle of reflection (e.g., the fourth angle) may equal the angle of incidence. Therefore, when the angle of refraction of the second portion of the light is 30 degrees or greater in a direction toward a side of the display device, the second portion of the light may be reflected at 30 degrees or greater toward the side of the display device. The result may be an improved viewing angle, allowing a viewer to read content presented by the device based on the reflections of light.

Figure 6:
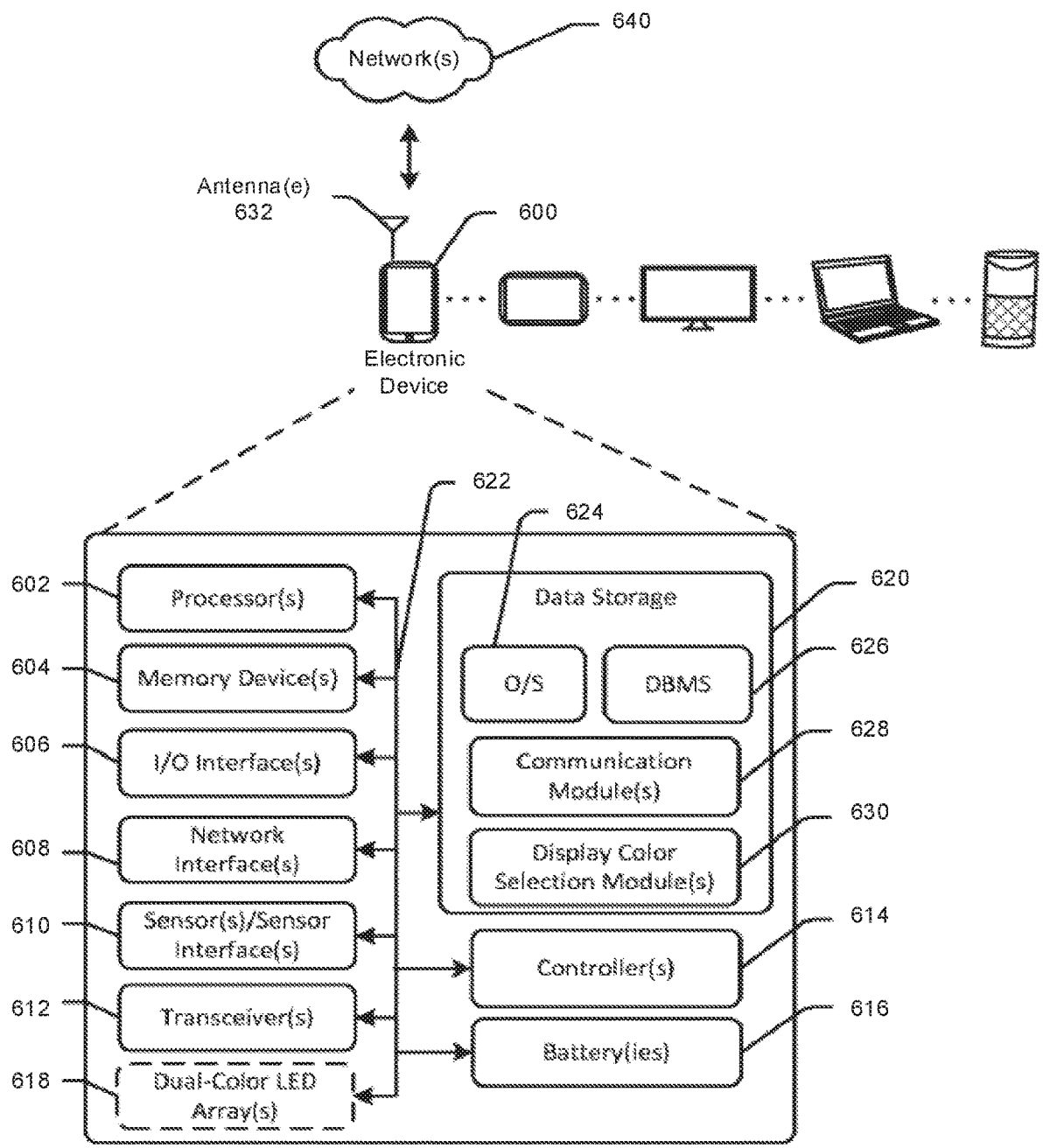
FIG. 6 schematically illustrates an example architecture of an electronic device in, accordance with one or more embodiments of the disclosure.

FIG. 6 is a schematic block diagram of one or more illustrative electronic device(s) 600 in accordance with one or more example embodiments of the disclosure.

The electronic device(s) 600 may include any suitable computing device including, but not limited to, a server system, a camera or camera system, a mobile device such as a smartphone, a tablet, an e-reader, a wearable device, a speaker device, or the like; desktop computer; a laptop computer; a content streaming device; a set-top box; or the like. The electronic device(s) 600 may correspond to an illustrative device configuration for the electronic device(s) of FIGS. 1-5.

The electronic device(s) 600 may be able to communicate via one or more networks with one or more servers, user devices, or the like. The electronic device(s) 600 may have a battery that is configured to prevent swelling or other damage, which may prevent damage to the electronic device(s) 600. The electronic device(s) 600 may be able to select one or more wireless communication protocols, and control operations of remote devices, such an internet of things devices, and other operations.

The electronic device(s) 600 may be configured to communicate via one or more networks 640. Such network(s) 640 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 640 may have any suitable communication range associated therewith and may include, for example, global networks (e.g., the Internet), metropolitan area networks (MANs), wide area networks (WANs), local area networks (LANs), or personal area networks (PANs). In addition, such network(s) 640 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 600 may include one or more processors (processor(s)) 602, one or more memory devices 604 (generically referred to as memory 604), one or more input/output (I/O) interfaces 606, one or more network interfaces 608, one or more sensors or sensor interfaces 610, one or more transceivers 612, one or more controllers 614, one or more batteries 616, one or more optional dual-color LED array(s) 618, and data storage 620. The electronic device(s) 600 may further include one or more buses 622 that functionally couple various components of the electronic device(s) 600. The electronic device(s) 600 may optionally include one or more antenna(e) 632 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, an RFID antenna, and so forth.

The bus(es) 622 may include at least one of a system bus, a memory bus, an address bus, or a message bus, and may permit the exchange of information (e.g., data (including computer-executable code), signaling, etc.) between various components of the electronic device(s) 600. The bus(es) 622 may include, without limitation, a memory bus or a memory controller, a peripheral bus, an accelerated graphics port, and so forth. The bus(es) 622 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 604 of the electronic device(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or nonremovable, are examples of computer-readable storage media (CRSM) as that term is used herein.

The data storage 620 may store computer-executable code, instructions, or the like that may be loadable into the memory 604 and executable by the processor(s) 602 to cause the processor(s) 702 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to the data storage 620 for non-volatile storage.

More specifically, the data storage 620 may store one or more operating systems (O/S) 624; one or more database management systems (DBMS) 626; and one or more program module(s), applications, engines, computer-executable code, scripts, or the like such as, for example, one or more communication module(s) 628 and/or one or more display color selection module(s) 630. Some or all of these module(s) may be or include sub-module(s).

Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support the functionality described in reference to the corresponding components named earlier in this disclosure.

The data storage 620 may further store various types of data utilized by the components of the electronic device(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 626 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, an example datastore(s) may include, for example, user account or user profile data, user device or battery settings, user device preferences and authorizations, and other information.

The processor(s) 602 may be configured to access the memory 604 and execute the computer-executable instructions loaded therein. For example, the processor(s) 602 may be configured to execute computer-executable instructions of the various program module(s), applications, engines, or the like of the electronic device(s) 600 to cause or facilitate various operations to be performed in accordance with one or more embodiments of the disclosure.

The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the communication module(s) 628 may include computer-executable instructions, code, or the like that responsive to execution by one or more of the processor(s) 602 may perform functions including, but not limited to, communicating with remote servers or devices, communicating with remote datastores, communicating with local servers or devices on an intranet, sending or receiving information and instructions, sending or receiving orders, sending and receiving content, and the like.

The display color selection module(s) 630 may include computer-executable instructions, code, or the like that responsive to execution by one or more of the processor(s) 602 may perform functions including, but not limited to, determining an LED color to activate, determining one or more LED colors to use, controlling operation of one or more LEDs or LED arrays, and the like.

Referring now to other illustrative components depicted as being stored in the data storage 620, the 0/S 624 may be loaded from the data storage 620 into the memory 604 and may provide an interface between other application software executing on the electronic device(s) 600 and the hardware resources of the electronic device(s) 600. More specifically, the 0/S 624 may include a set of computer-executable instructions for managing the hardware resources of the electronic device(s) 600 and for providing common services to other application programs (e.g., managing memory allocation among various application programs). In certain example embodiments, the O/S 624 may control execution of the other program module(s) to dynamically enhance characters for content rendering. The O/S 624 may include any operating system now known or which may be developed in the future including, but not limited to, any server operating system, any mainframe operating system, or any other proprietary or non-proprietary operating system.

The DBMS 626 may be loaded into the memory 604 and may support functionality for accessing, retrieving, storing, and/or manipulating data stored in the memory 604 and/or data stored in the data storage 620. The DBMS 626 may use any of a variety of database models (e.g., relational model, object model, etc.) and may support any of a variety of query languages. The DBMS 626 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 600 is a mobile device, the DBMS 626 may be any suitable light-weight DBMS optimized for performance on a mobile device.

Referring now to other illustrative components of the electronic device(s) 600, the input/output (I/O) interface(s) 606 may facilitate the receipt of input information by the electronic device(s) 600 from one or more I/O devices as well as the output of information from the electronic device(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), micro-USE, FireWire, Thunderbolt, Ethernet port or other connection protocol that may connect to one or more networks. The I/O interface(s) 606 may also include a connection to one or more of the antenna(e) 632 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, a WiMAX network, a 3G network, a ZigBee network, etc.

The electronic device(s) 600 may further include one or more network interface(s) 608 via which the electronic device(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The optional antenna(e) 632 may include any suitable type of antenna depending, for example, on the communications protocols used to transmit or receive signals via the antenna(e) 632. Non-limiting examples of suitable antennae may include directional antennae, non-directional antennae, dipole antennae, folded dipole antennae, patch antennae, multiple-input multiple-output (MIMO) antennae, or the like. The antenna(e) 632 may be communicatively coupled to one or more transceivers 612 or radio components to which or from which signals may be transmitted or received.

As previously described, the antenna(e) 632 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 632 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 632 may be able to transmit or receive radio frequency signals within any suitable frequency range forming part of the unlicensed portion of the radio spectrum.

The antenna(e) 632 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 632—transmitting or receiving radio frequency (RF) signals in the bandwidth and/or channels corresponding to the communications protocols utilized by the electronic device(s) 600 to communicate with other devices. The transceiver(s) 612 may include hardware, software, and/or firmware for modulating, transmitting, or receiving—potentially in cooperation with any of antenna(e) 632—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards.

The transceiver(s) 612 may further include hardware, firmware, or software for receiving GNSS signals. The transceiver(s) 612 may include any known receiver and baseband suitable for communicating via the communications protocols utilized by the electronic device(s) 600. The transceiver(s) 612 may further include a low noise amplifier (LNA), additional power signal amplifiers (PA), an analog-to-digital (A/D) converter, one or more buffers, a digital baseband, or the like.

The controller(s) 614 may be any microcontroller or microprocessor able to control one or more operations of the electronic device(s) 600. The battery(ies) 616 may be a swelling resistant pouch battery able to power the electronic device(s) 600. For example, the battery 616 may be a lithium-ion battery. The battery 616 may be coupled to the one or more optional dual-color LED array(s) 618. The one or more optional dual-color LED array(s) 618 may include one or more LED colors, such as amber colored LEDs, cool white LEDs, and other LED colors, and may include LEDs having a specific arrangement, such as an alternating arrangement, a separated arrangement, or another arrangement.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 6 as being stored in the data storage 620 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 600, and/or hosted on other computing device(s) accessible via one or more networks, may be provided to support the functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the electronic device(s) 600 may include alternate and/or additional hardware, software, or firmware components beyond those described or depicted without departing from the scope of the disclosure. More particularly, it should be appreciated that software, firmware, or hardware components depicted as forming part of the electronic device(s) 600 are merely illustrative and that some components may not be present or additional components may be provided in various embodiments. While various illustrative program module(s) have been depicted and described as software module(s) stored in the data storage 620, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, schematics, and use cases of FIGS. 1-5 may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

The processes described and shown above may be carried out or performed in any suitable order as desired in various implementations. Additionally, in certain implementations, at least a portion of the processes may be carried out in parallel. Furthermore, in certain implementations, less than or more than the processes described may be performed.

Certain aspects of the disclosure are described above with reference to flow diagrams of methods, apparatuses, or computer program products according to various implementations. It will be understood that one or more blocks of the flow diagrams, and combinations of blocks in the flow diagrams, can be implemented by computer-executable program instructions. Likewise, some blocks of the flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the flow diagrams support combinations of means for performing the specified functions, combinations of elements or steps for performing the specified functions and program instruction means for performing the specified functions. It will also be understood that each block of the flow diagrams, and combinations of blocks in the flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

What is claimed is:

1. A display device, comprising:
    a top end and a bottom end opposite the top end;
    a left side and a right side opposite the left side;
    a first light source and a second light source, the first light source and the second light source positioned proximate to the top end of the display device;
    a first light guide including first refractive features and extending linearly from the top end to the bottom end of the display device, the first light guide configured to receive first light from the first light source and second light from the second light source;
    a reflective display configured to cause presentation of content using the first light and the second light; and
    a second light guide extending linearly from the top end to the bottom end, the second light guide configured to receive a second portion of the second light from the second light source, the first light guide at least partially overlapping the second light guide, wherein a first axis spans from the top end to the bottom end, wherein the first light guide is positioned at a first angle with respect to the first axis, and wherein the second light guide is positioned at a second angle with respect to the first axis.

2. The display device of claim 1, wherein:
    the first refractive features are configured to:
        refract a first portion of the first light toward the reflective display in a first direction toward the left side; and
        refract a first portion of the second light toward the reflective display in a second direction toward the right side,
    the first direction is at a third angle to the first axis,
    the third angle is at least twenty degrees,
    the second direction is at a fourth angle to the first axis, and
    the fourth angle is at least twenty degrees.

3. The display device of claim 1, wherein the first refractive features are configured to:
    refract a first portion of the first light toward the reflective display in a first direction toward the left side; and
    refract a first portion of the second light toward the reflective display in a second direction toward the right side, and
    wherein the first direction is separated from the second direction by a third angle, wherein the third angle is along a transverse axis spanning from the left side to the right side.

4. The display device of claim 3, wherein the third angle is at least thirty degrees.

5. The display device of claim 1, wherein the first light guide further includes second refractive features, and wherein a first density of the first refractive features is substantially equal to a second density of the second refractive features.

6. The display device of claim 1, wherein the first light guide further includes second refractive features, wherein the first refractive features have a first density and the second refractive features have a second density, wherein the first density is different than the second density.

7. The display device of claim 6, wherein the first refractive features are positioned more proximate to the first light source than the second refractive features, and wherein the first density is less than the second density.

8. The display device of claim 1, wherein a refractive feature of the first refractive features is positioned at a first third angle relative to the first axis, and wherein a second refractive feature of the first refractive features is positioned at a fourth angle relative to the first axis, and wherein the third angle is different than the fourth angle.

9. The display device of claim 1, wherein a first refractive feature of the first refractive features is positioned at a third angle relative to the first axis, and wherein a second refractive feature of the first refractive features is positioned at a fourth angle relative to the first axis, and wherein the third angle relative to the first axis is equal to the fourth angle relative to the first axis.

10. The display device of claim 9, wherein the first light guide further includes a third refractive feature of the first refractive features, the third refractive feature positioned at a fifth angle relative to the first axis, and wherein the fifth angle relative to the first axis is different than the third angle relative to the first axis and different than the fourth angle relative to the first axis.

11. The display device of claim 1, wherein:
    the second light guide includes second refractive features configured to refract the second portion of the second light toward the reflective display,
    the first light guide directs the first light in a first direction, and
    the second light guide directs the second light in a second direction, the first direction not parallel to the second direction.

12. The display device of claim 11, wherein the first refractive features include a first number of the first refractive features, wherein the second light guide includes a second number of the second refractive features, and wherein the first number of the first refractive features is greater than the second number of the second refractive features.

13. The display device of claim 1, wherein the first light guide further includes second refractive features, and wherein a first density of the first refractive features is substantially equal to a second density of the second refractive features.

14. A device, comprising:
    a top end and a bottom end opposite the top end;
    a left side and a right side opposite the left side;
    a first light source and a second light source positioned proximate to the top end of the device;
    a first light guide including first refractive features and a second light guide including second refractive features, the first light guide and the second light guide extending linearly from the top end to the bottom end of the device, the first light guide configured to receive first light from the first light source, and the second light guide configured to receive second light from the second light source, the first light guide at least partially overlapping the second light guide, wherein the first light guide is positioned at a first angle with respect to a first axis that spans from the top end to the bottom end, and wherein the second light guide is positioned at a second angle with respect to the first axis; and a reflective display configured to cause presentation of content using the first light and the second light.

15. The device of claim 14, wherein:
the first refractive features are configured to:
refract a first portion of the first light toward the reflective display in a first direction toward the left side; and
refract a first portion of the second light toward the reflective display in a second direction toward the right side,
the first direction is at a third angle to the first axis,
the third angle is at least twenty degrees,
the second direction is at a fourth angle to the first axis, and
the fourth angle is at least twenty degrees.

16. The device of claim 14, the second light guide configured to receive a third portion of the second light from the second light source
wherein the second light guide includes third refractive features configured to refract the third portion of the second light toward the reflective display.

17. The device of claim 14, wherein the first light guide further includes third refractive features configured to refract a third portion of the first light toward the reflective display.

18. The device of claim 17, wherein the first light guide includes a first density of the first refractive features and a second density of the third refractive features, wherein the first density is substantially equal to the second density.

19. A display device, comprising:
a top end and a bottom end opposite the top end;
a left side and a right side opposite the left side;
a first light source and a second light source;
a first light guide including first refractive features and extending linearly from the top end to the bottom end of the display device, the first light guide configured to receive first light from the first light source and second light from the second light source;
a display configured to cause presentation of content using the first light and the second light; and
a second light guide extending linearly from the top end to the bottom end, the second light guide configured to receive a second portion of the second light from the second light source, the first light guide at least partially overlapping the second light guide, wherein a first axis spans from the top end to the bottom end, wherein the first light guide is positioned at a first angle with respect to the first axis, and wherein the second light guide is positioned at a second angle with respect to the first axis.

20. The display device of claim 19, wherein:
the first refractive features are configured to:
refract a first portion of the first light toward the display in a first direction toward the left side; and
refract a first portion of the second light toward the display in a second direction toward the right side,
the first direction is at a third angle to the first axis, and
the second direction is at a fourth angle to the first axis.

* * * * *